United States Patent
Ma et al.

(10) Patent No.: US 10,582,046 B2
(45) Date of Patent: Mar. 3, 2020

(54) VOICE RECOGNITION-BASED DIALING

(71) Applicant: Harman International Industries, Incorporated, Stamford, CT (US)

(72) Inventors: Jianjun Ma, Shanghai (CN); Liping Hu, Shanghai (CN); Richard Allen Kreifeldt, Shanghai (CN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 275 days.

(21) Appl. No.: 15/521,614

(22) PCT Filed: Dec. 30, 2014

(86) PCT No.: PCT/CN2014/095538
§ 371 (c)(1),
(2) Date: Apr. 24, 2017

(87) PCT Pub. No.: WO2016/106552
PCT Pub. Date: Jul. 7, 2016

(65) Prior Publication Data
US 2019/0116260 A1 Apr. 18, 2019

(51) Int. Cl.
*G10L 15/00* (2013.01)
*H04M 3/42* (2006.01)
(Continued)

(52) U.S. Cl.
CPC ....... *H04M 3/42204* (2013.01); *G10L 15/005* (2013.01); *G10L 15/18* (2013.01);
(Continued)

(58) Field of Classification Search
CPC .................................................. G10L 15/005
(Continued)

(56) References Cited

U.S. PATENT DOCUMENTS 7,225,130 B2 * 5/2007 Roth .................. G10L 15/19
704/253
7,313,526 B2 * 12/2007 Roth .................. G10L 15/19
704/253
(Continued)

FOREIGN PATENT DOCUMENTS

CN 101751387 A 6/2010
CN 103544145 A 1/2014

OTHER PUBLICATIONS

International Search Report For Application No. PCT/CN2014/095538, dated Oct. 9, 2015, 11 pages.
(Continued)

*Primary Examiner* — Susan I McFadden
(74) *Attorney, Agent, or Firm* — Artegis Law Group, LLP

(57) ABSTRACT

A voice recognition-based dialing method and a voice recognition-based dialing system are provided. The methods includes: determining a recognition result based on a user's voice input, at least one acoustic model and at least one language model, where the at least one acoustic model and the at least one language model are obtained based on information collected in an electronic device. The system includes: obtain at least one acoustic model and at least one language model based on information collected in an electronic device; and determine a recognition result based on a user's voice input, the at least one acoustic model and the at least one language model. The acoustic models and the language models are updated based on the information collected in the electronic device, which may be helpful to the voice recognition-based dialing.

18 Claims, 4 Drawing Sheets

(51) Int. Cl.
*G10L 15/18* (2013.01)
*G10L 15/22* (2006.01)
*H04W 4/029* (2018.01)

(52) U.S. Cl.
CPC ........ *G10L 15/22* (2013.01); *G10L 2015/223* (2013.01); *H04W 4/029* (2018.02)

(58) Field of Classification Search
USPC ........................................................ 704/200
See application file for complete search history.

(56) References Cited

U.S. PATENT DOCUMENTS

| | | | |
|---|---|---|---|
| 8,301,450 B2 * | 10/2012 | Lee | ................... G10L 15/1822 704/231 |
| 2008/0228480 A1 | 9/2008 | Maegawa | |
| 2012/0271617 A1 | 10/2012 | Nakajima et al. | |
| 2013/0238336 A1 | 9/2013 | Sung et al. | |
| 2014/0035823 A1 | 2/2014 | Khoe et al. | |

OTHER PUBLICATIONS

Extended European Search Report for Application No. 14909364.3 dated Aug. 3, 2018.

* cited by examiner

VOICE RECOGNITION-BASED DIALING

CROSS-REFERENCE TO RELATED APPLICATIONS

The present application is a national stage application of the international application titled, "VOICE RECOGNITION-BASED DIALING," filed on Dec. 30, 2014 and having application number PCT/CN2014/095538. The subject matter of this related application is hereby incorporated herein by reference.

TECHNICAL FIELD

The present disclosure generally relates to voice recognition-based dialing.

BACKGROUND

Voice dialing is a useful function in an electronic device, such as a phone or a head unit mounted on a vehicle, with which the electronic device retrieves a contact name or a phone number within a phonebook using voice recognition technology. In some existing solutions, the electronic device only supports dialing with certain languages, such as Chinese, English and Japanese, whose corresponding acoustic models and language models are pre-stored in the electronic device.

SUMMARY

In one embodiment, a voice recognition-based dialing method is provided. The method includes: determining a recognition result based on a user's voice input, at least one acoustic model and at least one language model, where the at least one acoustic model and the at least one language model are obtained based on information collected in an electronic device.

In some embodiments, the information collected in the electronic device may include content written by a language, and the at least one acoustic model and the at least one language model correspond to the language.

In some embodiments, the information collected in the electronic device may indicate a place, and the at least one acoustic model and the at least one language model correspond to a language used in the place.

In some embodiments, the information collected may include content in a phonebook in the electronic device. In some embodiments, the content in the phonebook may include contact names and corresponding phone numbers.

In some embodiments, the information collected may further include a language of an operating system of the electronic device. In some embodiments, the information collected may further include historical position information of the electronic device.

In some embodiments, the at least one acoustic model and the at least one language model may be contained in different voice recognition engines. In some embodiments, at least one voice recognition engine may be obtained based on the information collected in the electronic device.

In some embodiments, which language the user possibly uses when saying the voice input to the electronic device may be determined based on the information collected in the electronic device; and the at least one acoustic model and the at least one language model may be obtained based on the determined language.

In some embodiments, the recognition result of the voice input may be compared with the content in the phonebook, and the content in the phonebook which is matched with the recognition result may be determined to be a target contact name. The target contact name denotes to the contact name included in the voice input from the user, that is to say, the target contact name is the person the user wants to call.

In some embodiments, the determined target contact name may include a plurality of possible contact names, and one of the plurality of possible contact names may be selected to be dialed by the user.

In one embodiment, a voice recognition-based dialing system is provided. The voice recognition-based dialing system may include a processing device configured to: obtain at least one acoustic model and at least one language model based on information collected in an electronic device; and determine a recognition result based on a user's voice input, the at least one acoustic model and the at least one language model.

In some embodiments, the information collected in the electronic device may include content written by a language, and the at least one acoustic model and the at least one language model correspond to the language.

In some embodiments, the information collected in the electronic device may indicate a place, and the at least one acoustic model and the at least one language model correspond to a language used in the place.

In some embodiments, the information collected may include content in a phonebook in the electronic device. In some embodiments, the content in the phonebook may include contact names and corresponding phone numbers.

In some embodiments, the information collected may further include a language of an operating system of the electronic device. In some embodiments, the information collected may further include historical position information of the electronic device.

In some embodiments, the electronic device may include a microphone for receiving the user's voice input.

In some embodiments, the processing device may be mounted on the electronic device. In some embodiments, the electronic device may be a head unit or a cell phone.

In some embodiments, the processing device may be further configured to: determine which language the user possibly uses when saying the voice input to the electronic device based on the information collected in the electronic device; and download the at least one acoustic model and the at least one language model based on the determined language.

In some embodiments, the at least one acoustic model and the at least one language model are contained in different voice recognition engines. In some embodiments, the processing device may be further configured to download at least one voice recognition engine based on the information collected in the electronic device.

In some embodiments, the processing device may be further configured to: compare the recognition result of the voice input with the content in the phonebook; and determine the content in the phonebook which is matched with the recognition result to be a target contact name. The target contact name denotes to the contact name included in the voice input from the user, that is to say, the target contact name is the person the user wants to call.

In some embodiments, the processing device may be mounted on a server.

In some embodiments, the electronic device may be configured to send the information collected to the server, and the processing device may be further configured to:

determine possible languages the user speaks to the electronic device based on the information collected in the electronic device; and obtain the at least one acoustic model and the at least one language model based on the possible languages.

In some embodiments, the electronic device may be configured to: determine possible languages the user speaks to the electronic device based on the information collected in the electronic device; and send a list containing the possible language to the server, and the processing device may be configured to obtain the at least one acoustic model and the at least one language model based on the possible languages received.

In some embodiments, the electronic device may be further configured to send the user's voice input to the server, and the server may be further configured to send the recognition result to the electronic device.

In some embodiments, the at least one acoustic model and the at least one language model are contained in different voice recognition engines. In some embodiments, the processing device may be further configured to: obtain at least one voice recognition engine based on the information collected in the electronic device.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
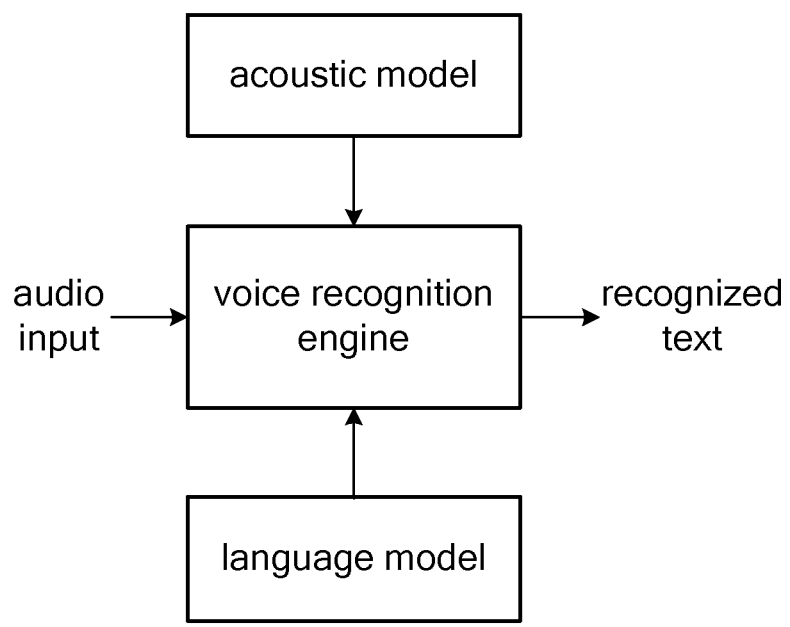
FIG. 1 is a schematic diagram of a general voice recognition system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Voice dialing is a function in an electronic device which brings much convenience for users. For example, when a user wants to call a person during driving, he or she may not dial the person by pressing corresponding keys on a mobile phone or head unit, but by saying a contact name or a phone number to a head unit which supports voice dialing. The head unit will retrieve the contact name or the phone number based on voice recognition technology.

Voice recognition is a process of converting audio input to text. Generally, the voice recognition process is performed by a software component known as a voice recognition engine. The primary function of the voice recognition engine is to process audio input and translate it into text that the electronic device can understand.

FIG. 1 is a schematic diagram of a general voice recognition system.

Generally, a voice recognition engine requires two types of files to recognize voice. One type is an acoustic model, which is created by taking acoustic recordings of speech and their transcriptions (taken from a speech corpus), and 'compiling' them into a statistical representations of the sounds that make up each word (through a process called 'training'). The other type is a language model. A language model uses a particular syntax or set of rules, to define the words and phrases that can be recognized by the voice recognition engine. The language model can be as simple as a list of words, or it can be flexible enough to allow such variability in what can be said that it approaches natural language capability. Once the voice recognition engine identifies the most likely match for what was said, it returns what it recognized as a text string.

In practice, a voice recognition engine may support several languages, that is, it can recognize audio input in the several languages. Generally, one language corresponds to one acoustic model and one language model. Thus, to realize voice recognition, a voice engine may contain several acoustic models and several corresponding language models.

In some existing solutions, an electronic device supporting voice dialing has several acoustic models and corresponding language models pre-stored therein. And the electronic device can recognize a user's voice in languages, such as Chinese, English and Japanese, corresponding to the several acoustic models and language models, but cannot recognize other voice in other languages, such as a dialect.

Figure 2:
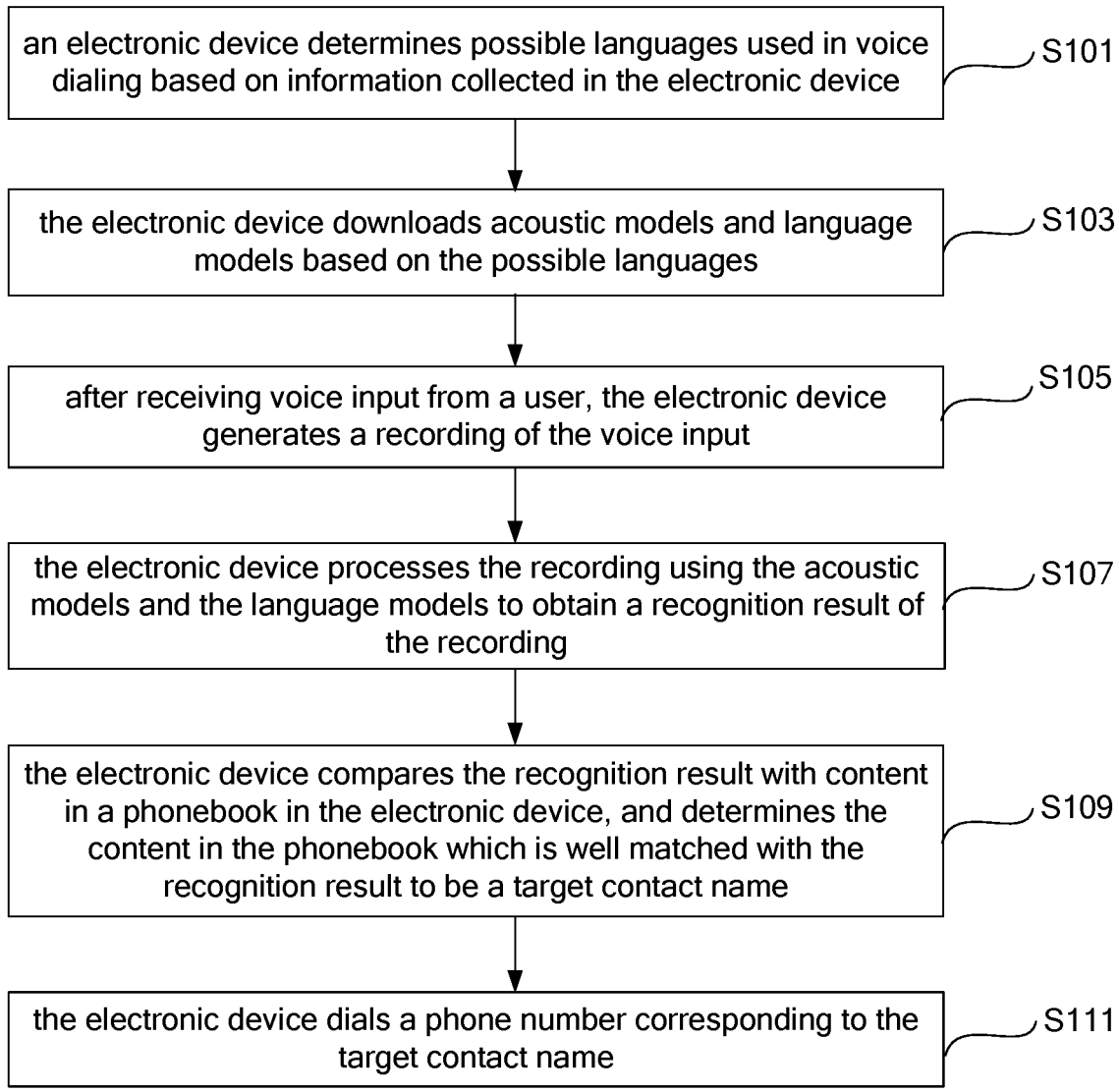
FIG. 2 is a flow chart of a voice recognition dialing method 100 according to an embodiment.

FIG. 2 illustrates a flow chart of a voice dialing method 100 according to an embodiment.

Referring to FIG. 2, in S101, an electronic device determines possible languages used in voice dialing based on information collected in the electronic device.

In some embodiments, the electronic device may have the voice dialing function. In some embodiments, the electronic device may be a head unit mounted on a vehicle or a mobile phone.

In some embodiments, the information collected in the electronic device may include content written by a language, and an acoustic model and a language model to be downloaded in a subsequent process may correspond to the language. In some embodiments, the information collected in the electronic device may indicate a place, and an acoustic model and a language model to be downloaded in a subsequent process may correspond to a language used in the place.

In some embodiments, the information collected may include content in a phonebook in the electronic device. In some embodiments, the content in the phonebook may include contact names and corresponding phone numbers. In some embodiments, acoustic models and language models may be downloaded based on languages of the contact names recorded in the phonebook and attributions of the phone numbers in a subsequent process.

In some embodiments, the information collected may further include a language of an operating system of the electronic device. In some embodiments, the information collected may further include historical position information of the electronic device.

In some embodiments, the possible languages may include official languages in countries or dialects in various regions of countries.

It should be noted that, as the information collected in the electronic device varies, the determination process for the possible languages used in the voice dialing is dynamic.

In S103, the electronic device downloads acoustic models and language models based on the possible languages.

In some embodiments, the acoustic models may be corresponding to the language models, that is, each acoustic model corresponds to one language model. An acoustic model and its corresponding language model are used for identifying one language.

In some embodiments, the acoustic models and the language models are contained in different voice recognition engines, that is, the possible languages may be supported by different voice recognition engines. One voice recognition engine may support some certain languages, but may not support the languages and dialects all around the world.

For example, a Siri voice recognition engine works in many countries, such as United states, United Kingdom, China and Canada, and can understand and speak in multiple languages and dialects. The Siri voice recognition engine was designed to recognize the specific accents in the supported countries. It supports more than ten languages, such as English, Spanish, Mandarin and Japanese.

For another example, a voice recognition engine produced by iFLYTEK can support Mandarin, English and Cantonese.

In some embodiments, the acoustic models and language models to be downloaded may be contained in different voice recognition engines, where some of the different engines are contained in the electronic device and some of the different engines are not contained in the electronic device. That is to say, some of the possible languages are supported by the voice recognition engines contained in the electronic device, and some of the possible languages are supported by voice recognition engines not contained in the electronic device. Thus, the electronic device may further download the voice recognition engines which are not contained in the electronic device.

It should be noted that, as the possible languages vary with the information collected in the electronic device, the downloading process for the acoustic models and the language models are dynamic.

In S105, after receiving voice input from a user, the electronic device generates a recording of the voice input.

In some embodiments, the electronic device may have a microphone to receive the voice input. After receiving the voice input, the electronic device may record the voice input. In some embodiments, the voice input may include a contact name in the phonebook in the electronic device.

In S107, the electronic device processes the recording using the acoustic models and the language models to obtain a recognition result of the recording.

In some embodiments, the recording is input into the voice recognition engines containing the acoustic models and the language models to be processed.

In some embodiments, in a voice recognition engine, the recording may be input into the acoustic model to obtain syllables, and the syllables may be input into the language model to obtain words. A detailed process for voice recognition is well known in the art and is not described in detail there.

In some embodiments, before input into the voice recognition engines, the recording is encoded.

In some embodiments, one downloaded acoustic model and one corresponding language model may be matched with the recording, and the words obtained from the corresponding language model may be the recognition result.

In some embodiments, the recognition result may include words obtained from more than one language models, that is, more than one acoustic models and more than one corresponding language models are matched with the recording. The recognition result may be represented by recognized words output from each of the matched language models along with their matching degree, respectively.

In S109, the electronic device compares the recognition result with content in a phonebook in the electronic device, and determines the content in the phonebook which is well matched with the recognition result to be a target contact name.

In some embodiments, the target contact name denotes to the contact name included in the voice input from the user, that is to say, the target contact name is the person the user wants to call.

In S111, the electronic device dials a phone number corresponding to the target contact name.

In some embodiments, the target contact name may include a plurality of possible contact names, the electronic device may present the plurality of possible contact names on a displaying device, so that one of the plurality of possible contact names may be selected to be dialed by the user.

From above, based on information collected in an electronic device, such as a phonebook, a language of an operating system and historical position information of the electronic device, an electronic device may determine possible languages a user may be used in voice dialing and download acoustic models and language models according to the possible languages. In this manner, the acoustic models and the language models are updated based on the information collected in the electronic device, which may be helpful to the voice recognition-based dialing.

Figure 3:
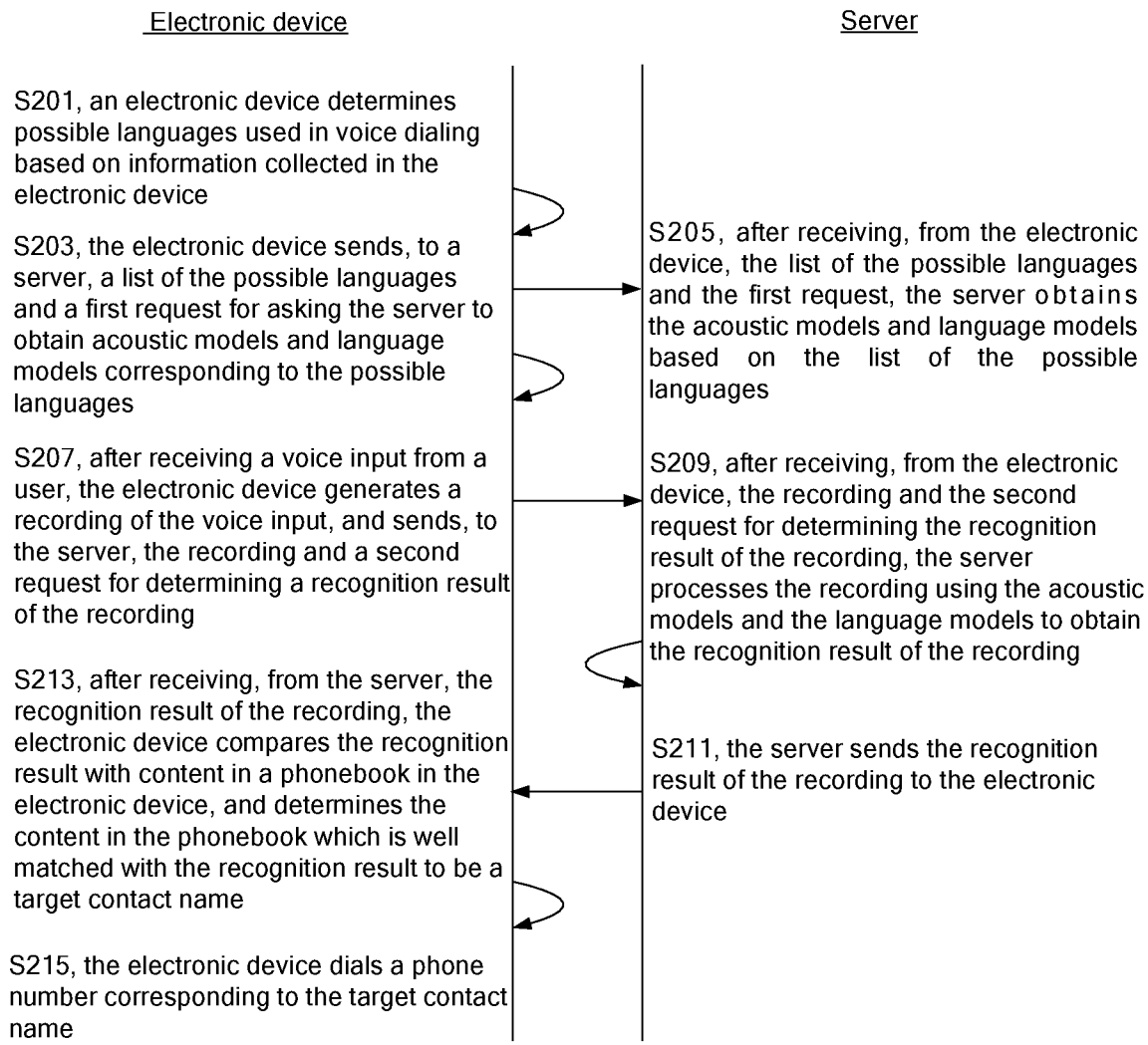
FIG. 3 is a flow chart of a voice recognition dialing method 200 according to an embodiment.

FIG. 3 illustrates a flow chart of a voice dialing method 200 according to an embodiment.

Referring to FIG. 3, in S201, an electronic device determines possible languages used in voice dialing based on information collected in the electronic device.

In some embodiments, the electronic device may have the voice dialing function. In some embodiments, the electronic device may be a head unit mounted on a vehicle or a mobile phone.

In some embodiments, the information collected in the electronic device may include content written by a language, and acoustic models and language models to be obtained in a subsequent process may correspond to the language.

In some embodiments, the information collected in the electronic device may indicate a place, and acoustic models and language models to be obtained in a subsequent process may correspond to languages used in the place.

In some embodiments, the information collected may include content in a phonebook in the electronic device. In some embodiments, the content in the phonebook may include contact names and corresponding phone numbers. In some embodiments, acoustic models and language models may be obtained based on languages of the contact names recorded in the phonebook and attributions of the phone numbers in a subsequent process.

In some embodiments, the information collected may further include a language of an operating system of the electronic device. In some embodiments, the information collected may further include historical position information of the electronic device.

In S203, the electronic device sends, to a server, a list of the possible languages and a first request for asking the server to obtain acoustic models and language models corresponding to the possible languages.

Different from the embodiments above, in some embodiments, the electronic device may not download the acoustic models and the language models itself, and may request the server to obtain them, which can alleviate calculation burden.

In S205, after receiving, from the electronic device, the list of the possible languages and the first request, the server obtains acoustic models and language models based on the list of the possible languages.

In some embodiments, the acoustic models and the language models may be contained in different voice recognition engines.

In some embodiments, the server may further obtain voice recognition engines containing the acoustic models and language models.

Optionally, in some embodiments, the electronic device may not send the list of the possible languages to the server but send the information collected to the server, and the server may determine the possible languages based on the information collected received from the electronic device.

In S207, after receiving a voice input from a user, the electronic device generates a recording of the voice input, and sends, to the server, the recording and a second request for determining a recognition result of the recording.

In some embodiments, the electronic device may have a microphone to receive the voice input. In some embodiments, the voice input may include a contact name in the phonebook in the electronic device.

Different from the embodiments above, in some embodiments, the electronic device may not determine the recognition result of the recording itself, and may request the server to determine it, which can further alleviate calculation burden.

In S209, after receiving, from the electronic device, the recording and the second request for determining the recognition result of the recording, the server processes the recording using the acoustic models and the language models to obtain the recognition result of the recording.

In some embodiments, the recording is input into the voice recognition engines containing the acoustic models and the language models to be processed. In some embodiments, in a voice recognition engine, the recording may be input into the acoustic model to obtain syllables, and the syllables may be input into the language model to obtain words.

In some embodiments, before input into the voice recognition engines, the recording may be encoded.

In some embodiments, at least one acoustic model and at least one corresponding language model may be matched with the recording, and the words obtained from the at least one corresponding language model may be the recognition result.

In S211, the server sends the recognition result of the recording to the electronic device.

In S213, after receiving, from the server, the recognition result of the recording, the electronic device compares the recognition result with content in a phonebook in the electronic device, and determines the content in the phonebook which is well matched with the recognition result to be a target contact name.

In S215, the electronic device dials a phone number corresponding to the target contact name.

In some embodiments, the target contact name may include a plurality of possible contact names, the electronic device may present the plurality of possible contact names on a displaying device, so that one of the plurality of possible contact names may be selected to be dialed by the user.

From above, based on information collected in an electronic device, such as a phonebook, a language of an operating system and historical position information of the electronic device, the electronic device may determine possible languages which may be used in voice dialing by a user, and request a server to obtain acoustic models and language models according to the possible languages. In this manner, the acoustic models and the language models are updated by the server based on the information collected in the electronic device, which may be helpful to the voice recognition-based dialing and alleviate calculation burden.

Figure 4:
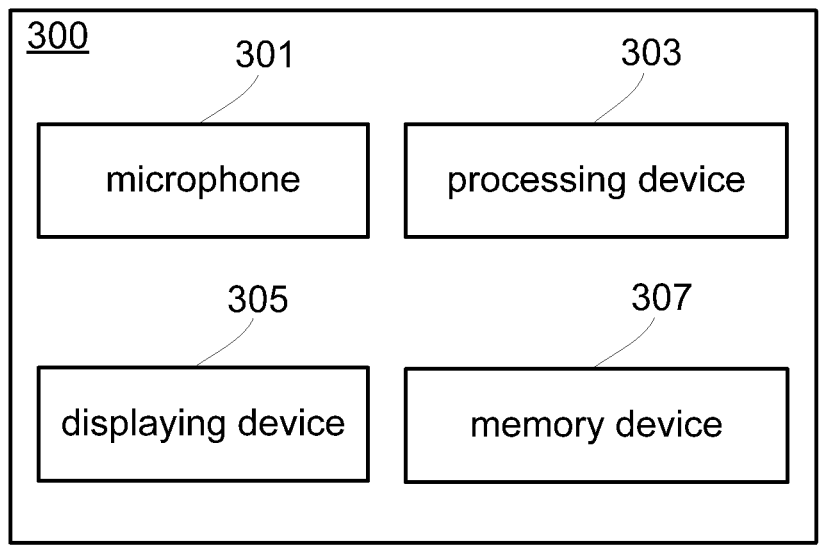
FIG. 4 is a schematic block diagram of a voice recognition dialing system 300 mounted on a first vehicle according to an embodiment.

FIG. 4 illustrates a schematic block diagram of a voice recognition-based dialing system 300 mounted on an electronic device according to one embodiment. Referring to FIG. 4, the voice recognition-based dialing system 300 includes a microphone 301, a processing device 303, a displaying device 305 and a memory device 307.

In some embodiments, the electronic device may be a head unit mounted on a vehicle or a mobile phone.

In some embodiments, the processing device 303 may be configured to determine possible languages used in voice dialing based on information collected in the electronic device.

In some embodiments, the information collected in the electronic device may include content written by a language, and the at least one acoustic model and the at least one language model correspond to the language. In some embodiments, the information collected in the electronic device may indicate a place, and the at least one acoustic model and the at least one language model correspond to a language used in the place.

In some embodiments, the information collected may include content in a phonebook in the electronic device. In some embodiments, the content in the phonebook may include contact names and corresponding phone numbers. In some embodiments, the acoustic models and the language models may be downloaded based on languages of the contact names recorded in the phonebook and attributions of the phone numbers.

In some embodiments, the information collected may further include a language of an operating system of the electronic device. In some embodiments, the information collected may further include historical position information of the electronic device.

In some embodiments, the processing device 303 may be further configured to download acoustic models and language models based on the possible languages.

In some embodiments, the acoustic models and the language models are contained in different voice recognition engines.

In some embodiments, some of the possible languages are supported by the voice recognition engines contained in the electronic device, and some of the possible languages are supported by voice recognition engines not contained in the electronic device. Thus, the processing device 303 may be further configured to download the voice recognition engines which are not contained in the electronic device.

In some embodiments, the processing device 303 may be further configured to: after the microphone receives a voice input from the user, generate a recording of the voice input; process the recording using the acoustic models and the language models to obtain a recognition result of the recording; compare the recognition result with the content in the phonebook in the electronic device; and determine the content in the phonebook which is well matched with the recognition result to be a target contact name.

In some embodiments, the processing device 303 may be further configured to control to dial a phone number corresponding to the target contact name.

In some embodiments, the target contact name may include a plurality of possible contact names. In some embodiments, the processing device 303 may be further configured to control the displaying device 305 to present the plurality of possible contact names to the user, so that one of the plurality of possible contact names may be selected to be dialed by the user.

In some embodiments, the processing device 303 may be a CPU, or a MCU, or a DSP etc., or any combination thereof. The memory device 307 may store an operating system and program instructions.

Figure 5:
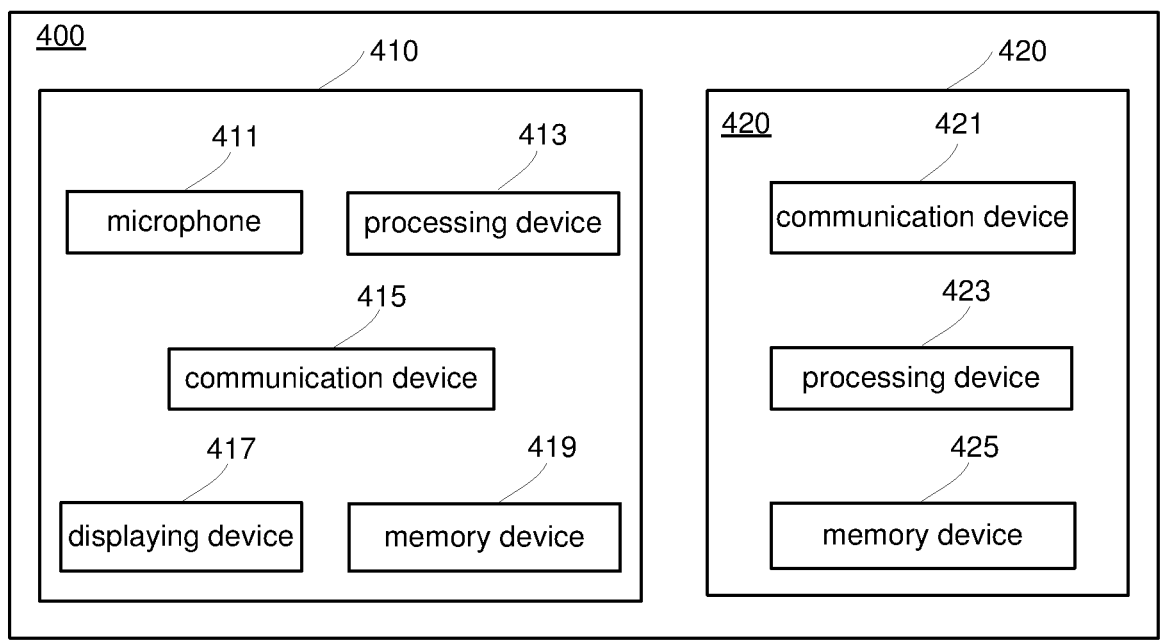
FIG. 5 is a schematic block diagram of a voice recognition dialing system 400 according to an embodiment.

FIG. 5 illustrates a schematic block diagram of a voice recognition-based dialing system 400 according to one embodiment. Referring to FIG. 5, the voice recognition-based dialing system 400 includes an electronic device 410 and a server 420. The electronic device 410 includes a microphone 411, a processing device 413, a transmission device 415, a displaying device 417 and a memory device 419. The server 420 includes a transmission device 421, a processing device 423 and a memory device 425.

In some embodiments, the electronic device 410 may be a head unit mounted on a vehicle or a mobile phone.

In some embodiments, the processing device 413 may be configured to determine possible languages used in voice dialing based on information collected in the electronic device 410.

In some embodiments, the information collected in the electronic device 410 may include content written by a language. In some embodiments, the information collected in the electronic device 410 may indicate a place.

In some embodiments, the information collected may include content in a phonebook in the electronic device 410. In some embodiments, the content in the phonebook may include contact names and corresponding phone numbers.

In some embodiments, the information collected may further include a language of an operating system of the electronic device 410. In some embodiments, the information collected may further include historical position information of the electronic device 410.

In some embodiments, the transmission device 415 may be configured to send, to the server 420, a list of the possible languages and a first request for asking the server to obtain acoustic models and language models corresponding to the possible languages.

The microphone 411 is used for receiving voice input of a user. In some embodiments, the voice input may include a contact name in the phonebook in the electronic device 410.

The processing device 413 may be further configured to generate a recording of the voice input, and the transmission device 415 may be configured to send, to the server 420, the recording and a second request for determining a recognition result of the recording.

In some embodiments, the processing device 413 may be further configured to: after the recognition result of the recording is received by the transmission device 415, compare the recognition result with the content in the phonebook in the electronic device 410; and determine the content in the phonebook which is well matched with the recognition result to be a target contact name.

In some embodiments, the processing device 413 may be further configured to control to dial a phone number corresponding to the target contact name.

In some embodiments, the target contact name may include a plurality of possible contact names. In some embodiments, the processing device 413 may be further configured to control the displaying device 417 to present the plurality of possible contact names to the user, so that one of the plurality of possible contact names may be selected to be dialed by the user.

In some embodiments, the processing device 413 may be a CPU, or a MCU, or a DSP etc., or any combination thereof. The memory device 419 may store an operating system and program instructions.

In some embodiments, the processing device 423 may be configured to: after the list of the possible languages and the first request are received by the transmission device 421, obtain the acoustic models and the language models based on the list of the possible languages.

In some embodiments, the acoustic models and the language models may be contained in different voice recognition engines. In some embodiments, the processing device 423 may be further configured to: obtain voice recognition engines containing the acoustic models and language models.

In some embodiments, the processing device 423 may be further configured to: after the recording and the second request are received by the transmission device 421, process the recording using the acoustic models and the language models to obtain the recognition result of the recording.

In some embodiments, the transmission device 421 may be configured to send the recognition result of the recording to the electronic device 410.

In some embodiments, the processing device 423 may be a CPU, or a MCU, or a DSP etc., or any combination thereof. The memory device 425 may store an operating system and program instructions.

Optionally, in some embodiments, the processing device 413 may not be configured to determine the possible languages used in voice dialing based on the information collected in the electronic device 410. Instead, the transmission device 415 may be configured to send the information collected in the electronic device 410 to the server 420, and after the transmission device 421 receives the information collected from the electronic device 410, the processing device 423 may be configured to determine the possible languages based on the information collected.

According to one embodiment, a non-transitory computer readable medium, which contains a computer program for voice recognition-based dialing, is provided. When the computer program is executed by a processor, it will instruct the processor to: determine a recognition result based on a user's voice input, at least one acoustic model and at least one language model, where the at least one acoustic model and the at least one language model are obtained based on information collected in an electronic device.

There is little distinction left between hardware and software implementations of aspects of systems; the use of hardware or software is generally a design choice representing cost vs. efficiency tradeoffs. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A voice recognition-based dialing method, comprising:
   determining, based on a set of information collected at an electronic device, at least one candidate language employed by a user in a received voice input;
   receiving, by the electronic device:
      at least one acoustic model associated with the at least one candidate language, and
      at least one language model associated with the at least one candidate language; and
   determining, by the electronic device, a recognition result based on a user's voice input, the at least one acoustic model and the at least one language model.

2. The voice recognition-based dialing method according to claim 1, wherein the set of information collected comprises content written in the at least one candidate language.

3. The voice recognition-based dialing method according to claim 1, wherein the set of information collected comprises content in a phonebook included in the electronic device.

4. The voice recognition-based dialing method according to claim 1, wherein:
   the set of information collected indicates a place, and
   the at least one candidate language corresponds to a language spoken in the place.

5. The voice recognition-based dialing method according to claim 1, wherein the set of information collected comprises historical position information of the electronic device.

6. The voice recognition-based dialing method according to claim 1, further comprising obtaining, based on the set of information, one or more voice recognition engines.

7. The voice recognition-based dialing method according to claim 1, further comprising:
   comparing the recognition result with content included in a phonebook included in the electronic device, and
   when the content included in the phonebook matches the recognition result, determining the content to be a target contact name.

8. A voice recognition-based dialing system, comprising:
   an electronic device; and
   a processing device that:
      determines, based on a set of information collected by the electronic device, at least one candidate language employed by a user in received voice input;
      receives at least one acoustic model associated with the at least one candidate language;
      receives at least one language model associated with the at least one candidate language; and
      determines a recognition result based on a user's voice input, the at least one acoustic model, and the at least one language model.

9. The voice recognition-based dialing system according to claim 8, wherein the processing device further obtains at least one voice recognition engine based on the set of information collected.

10. The voice recognition-based dialing system according to claim 8, wherein the set of information collected in the electronic device comprises content written in the at least one candidate language.

11. The voice recognition-based dialing system according to claim 8, wherein the set of information collected comprises content in a phonebook included in the electronic device.

12. The voice recognition-based dialing system according to claim 8, wherein:
   the set of information collected indicates a place, and
   the at least one candidate language corresponds to a language spoken in the place.

13. The voice recognition-based dialing method according to claim 8, wherein the set of information collected comprises historical position information of the electronic device.

14. The voice recognition-based dialing system according to claim 8, wherein the processing device is mounted on the electronic device.

15. The voice recognition-based dialing system according to claim 14, wherein the processing device further:
   compares the recognition result with content included in a phonebook included in the electronic device; and
   when the content included in the phonebook matches the recognition result, determining the content to be a target contact name.

16. The voice recognition-based dialing system according to claim 8, further comprising a server, wherein the processing device is mounted on a server.

17. The voice recognition-based dialing system according to claim 16, wherein the electronic device further:
   determines, based on the set of information collected, at least one language the user speaks to the electronic device as the at least one candidate language; and
   sends, to the server, a list containing the at least one candidate language.

18. The voice recognition-based dialing system according to claim 16, wherein the electronic device sends, to the server, the set of information collected.

* * * * *